US009013468B2

(12) United States Patent
Choi et al.

(10) Patent No.: US 9,013,468 B2

(45) Date of Patent: Apr. 21, 2015

(54) DISPLAY DEVICE ABLE TO PREVENT AN ABNORMAL DISPLAY CAUSED BY A SOFT FAIL AND A METHOD OF DRIVING THE SAME

(71) Applicant: Samsung Display Co., Ltd., Gyeonggi-Do (KR)

(72) Inventors: Kyung-Uk Choi, Gyeonggi-do (KR); Seon Hye Kim, Gyeonggi-do (KR); Sang Hyun Lee, Incheon (KR); Jeong Bong Lee, Busan (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 195 days.

(21) Appl. No.: 13/734,324

(22) Filed: Jan. 4, 2013

(65) Prior Publication Data

US 2014/0049532 A1 Feb. 20, 2014

(30) Foreign Application Priority Data

Aug. 17, 2012 (KR) ........................ 10-2012-0090010

(51) Int. Cl.

| | |
|---|---|
| ***G09G 5/00*** | (2006.01) |
| ***G06F 3/038*** | (2013.01) |
| ***G09G 3/20*** | (2006.01) |
| ***G09G 5/18*** | (2006.01) |

(52) U.S. Cl.

CPC .............. *G09G 5/00* (2013.01); *G09G 2330/06* (2013.01); *G09G 2310/0289* (2013.01); *G09G 3/20* (2013.01); *G09G 5/18* (2013.01); *G09G 2370/08* (2013.01)

(58) Field of Classification Search

USPC ...................... 345/87, 99, 204–206, 211–213

See application file for complete search history.

(56) References Cited

U.S. PATENT DOCUMENTS

| | | | | |
|---|---|---|---|---|
| 7,190,343 | B2 | 3/2007 | Baek et al. | |
| 8,138,792 | B2 | 3/2012 | Chang et al. | |
| 2008/0117158 | A1* | 5/2008 | Kim et al. | 345/99 |
| 2008/0122824 | A1 | 5/2008 | Lee | |
| 2010/0123701 | A1* | 5/2010 | Yeo | 345/211 |
| 2010/0220079 | A1* | 9/2010 | Bang et al. | 345/204 |
| 2012/0056857 | A1* | 3/2012 | Li et al. | 345/204 |
| 2012/0098800 | A1* | 4/2012 | Kim et al. | 345/204 |
| 2012/0146980 | A1* | 6/2012 | Lee et al. | 345/211 |
| 2013/0127795 | A1* | 5/2013 | Hsu et al. | 345/204 |

FOREIGN PATENT DOCUMENTS

| | | |
|---|---|---|
| JP | 4200683 | 10/2008 |
| JP | 2008-287194 | 11/2008 |
| KR | 1020070002913 | 1/2007 |
| KR | 1020070090310 | 9/2007 |
| KR | 1020070109551 | 11/2007 |

(Continued)

*Primary Examiner* — Gerald Johnson

*Assistant Examiner* — Maheen Javed

(74) *Attorney, Agent, or Firm* — F. Chau & Associates, LLC

(57) ABSTRACT

A display device includes a data driver for applying a data signal to a data line; a gate driver for applying a gate signal to a gate line; a level shifter for shifting a voltage level of a signal applied to the gate driver; and a signal controller for controlling the data driver, the level shifter, and the gate driver, wherein when a signal exchange between the data driver and the signal controller has an abnormality, the signal controller maintains a control signal applied to the level shifter in an off level.

13 Claims, 5 Drawing Sheets

(56) References Cited

FOREIGN PATENT DOCUMENTS

| | | |
|---|---|---|
| KR | 1020080039717 | 5/2008 |
| KR | 10-0973807 | 7/2010 |
| KR | 1020110079038 | 7/2011 |
| KR | 10-1112063 | 1/2012 |

* cited by examiner

DISPLAY DEVICE ABLE TO PREVENT AN ABNORMAL DISPLAY CAUSED BY A SOFT FAIL AND A METHOD OF DRIVING THE SAME

CROSS-REFERENCE TO RELATED APPLICATION

This application claims priority under 35 U.S.C. §119 to Korean Patent Application No. 10-2012-0090010 filed in the Korean Intellectual Property Office on Aug. 17, 2012, the disclosure of which is incorporated by reference herein in its entirety.

TECHNICAL FIELD

The present invention relates to a display device and a method of driving the same.

DISCUSSION OF THE RELATED ART

As electronic products become light and thin with high capability, design for quality is a focus. For example, in the development of a display device, measures are taken for dealing with electromagnetic noise such as electromagnetic interference (EMI) and electro static discharge (ESD), in other words, static electricity.

Defects due to static electricity are typically classified into a hard fail and a soft fail. The hard fail may refer to a defect in which a device itself is damaged by the static electricity and cannot return to an original state even though it has been restarted. The soft fail may refer to a defect in which an abnormal image appears on a screen due to static electricity even though the device is not damaged. To cope with static electricity, various countermeasures are made in a component's design. However, certain components may temporarily malfunction due to signal noise caused by static electricity of an outside soft fail, not because of an internal problem of the component. For example, when the soft fail is generated, a signal controller, a driving device, or the like loses a normal signal, so that an abnormal image is displayed on the screen.

SUMMARY

An exemplary embodiment of the present invention provides a display device including: a data driver for applying a data signal to a data line; a gate driver for applying a gate signal to a gate line; a level shifter for shifting a voltage level of a signal applied to the gate driver; and a signal controller for controlling the data driver, the level shifter, and the gate driver, wherein when a signal exchange between the data driver and the signal controller has an abnormality, the signal controller maintains a control signal applied to the level shifter in an off level.

The control signal may include a vertical synchronization start signal and vertical clock signals.

The signal controller may output a gate driver off signal to the level shifter, and the signal controller puts the gate driver off signal in a high level and transmits the gate driver off signal to the level shifter when the signal exchange between the data driver and the signal controller has the abnormality.

The level shifter may comprise: a controller for receiving the vertical synchronization start signal and the vertical clock signals; a logic gate for receiving the gate driver off signal, the vertical synchronization start signal and the vertical clock signals, putting a gate blocking signal in the high level and outputting the gate blocking signal to the controller when the vertical synchronization start signal and the vertical clock signals are in a low level and the gate driver off signal is in the high level; and a charge share unit for amplifying voltages of the vertical synchronization start signal and the vertical clock signals according to a control of the controller to generate a gate pulse start signal and a pair of gate clock signals and outputting the gate pulse start signal and the pair of gate clock signals to the gate driver, or giving the gate pulse start signal and the gate clock signals an off voltage and outputting the gate pulse start signal and the gate clock signals to the gate driver.

The charge share unit may output the gate pulse start signal and the gate clock signals having the off voltage to the gate driver when the gate blocking signal is in the high level.

The data driver may check whether an output image signal received from the signal controller conforms to a preset format, put a lock signal in a high state and output the lock signal to the signal controller when the output image signal conforms to the preset format, and put the lock signal in a low state and output the lock signal to the signal controller when the output image signal does not conform to the preset format.

When the lock signal may be in the low state, the signal controller maintains a load signal output to the data driver in the low state.

The lock signal in the low state may indicate the signal exchange between the data driver and the signal controller has the abnormality.

The abnormality may be due to static electricity.

An exemplary embodiment of the present invention provides a method of driving a display device including: checking, by using a data driver, whether an output image signal received from a signal controller conforms to a preset format, and putting a lock signal in a low state and outputting the lock signal to the signal controller when the output image signal does not conform to the preset format, and maintaining, by using the second controller, a control signal applied to a level shifter in an off level when the lock signal is in the low state.

The control signal may include a vertical synchronization start signal and vertical clock signals.

The signal controller may output a gate driver off signal to the level shifter, and the signal controller may put the gate driver off signal in a high level and output the gate driver off signal to the level shifter when the lock signal is in the low state.

The method may further include generating, by using the level shifter, a gate pulse start signal and gate clock signals to have an off voltage, and outputting the gate pulse start signal and the gate clock signals to a gate driver when the vertical synchronization start signal and the vertical clock signals are in the low level and the gate driver off signal is in the high level.

The method further includes maintaining, by using the signal controller, a load signal output to the data driver in the low state when the lock signal is in the low state.

An exemplary embodiment of the present invention provides a display device including: a data driver, a gate driver, a signal controller and a level shifter, the data driver configured to identify an abnormality in a signal exchange between the signal controller and the data driver and generate a lock signal, the signal controller configured to maintain a level of a first control signal applied to the level shifter in response to the lock signal, the level shifter configured to maintain a level of a second control signal applied to the gate driver in response to the first control signal, and the gate driver configured to continuously apply a gate off voltage to all gate lines in response to the second control signal.

The continuous application of the gate off voltage causes an image previously displayed on a screen of the display device to continue to be displayed on the screen.

When the signal exchange between the signal controller and the data driver becomes normal, a gate on voltage is applied to the gate lines.

DETAILED DESCRIPTION OF THE EMBODIMENTS

Exemplary embodiments of the present invention will be described more fully hereinafter with reference to the accompanying drawings. However, the present invention may be embodied in various different ways and should not be construed as limited to the embodiments disclosed herein.

First, a driving device for a display device according to an exemplary embodiment of the present invention will be described with reference to FIG. 1.

Figure 1:
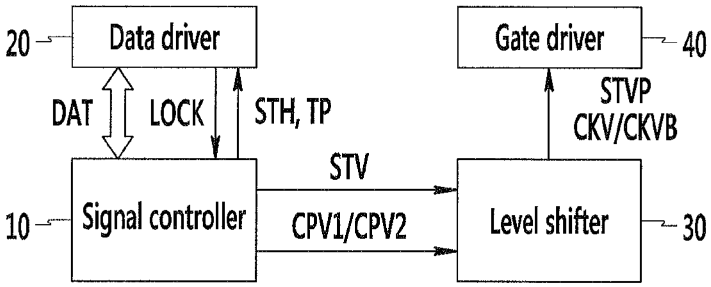
FIG. 1 is a block diagram of a driving device for a display device according to an exemplary embodiment of the present invention.

FIG. 1 is a block diagram of a driving device for a display device according to an exemplary embodiment of the present invention.

A driving device for a display device according to an exemplary embodiment of the present invention includes a signal controller 10 (Tcon), a data driver 20, a level shifter 30, and a gate driver 40.

The signal controller 10 receives an input image signal and an input control signal for controlling the display of the input image signal from the outside, and generates an output image signal DAT, a gate control signal, a data control signal and the like based on the signals input thereto. Examples of the input control signal include a vertical synchronization signal, a horizontal synchronization signal, a main clock signal, a data enable signal and the like. The signal controller 10 transmits the gate control signal to the level shifter 30, and transmits the data control signal and the output image signal DAT to the data driver 20. The gate control signal includes a vertical synchronization start signal STV for instructing an output start of a gate-on pulse and vertical clock signals CPV1 and CPV2 for controlling an output time of the gate-on pulse, and the data control signal includes a horizontal synchronization start signal STH for instructing an input start of the output image signal DAT and a load signal TP for applying a corresponding data voltage to a data line. The output image signal DAT contains a clock signal to periodically identify timing.

The data driver 20 receives the output image signal DAT for one pixel row according to the data control signal input from the signal controller 10, converts each output image signal DAT to an analog data voltage, and then applies the converted analog data voltage to a corresponding data line (not shown). Further, the data driver 20 checks whether the output image signal DAT conforms to a predetermined format by using the clock signal contained in the output image signal DAT. When the output image signal DAT conforms to the predetermined format, the data driver 20 recognizes the output image signal DAT as a normal signal, and then shifts a level of a lock signal LOCK transmitted to the signal controller 10 to a high level from a low level. When the output image signal DAT input from the signal controller 10 does not conform to the predetermined format, the data driver 20 shifts the level of the lock signal LOCK transmitted to the signal controller 10 to the low level from the high level, thereby informing the signal controller 10 that the output image signal DAT is abnormal.

The level shifter 30 receives the vertical synchronization start signal STV and the vertical clock signals CPV1 and CPV2, generates a gate pulse start signal STVP and a pair of gate clock signals CKV and CKVB by amplifying voltages of the vertical synchronization start signal STV and the vertical clock signals CPV1 and CPV2, and outputs the gate pulse start signal STVP and the pair of gate clock signals CKV and CKVB to the gate driver 40.

The gate driver 40 generates a gate-on voltage and a gate-off voltage by using the gate pulse start signal STVP and the pair of gate clock signals CKV and CKVB output by the level shifter 30, and applies the gate-on voltage and gate-off voltage to a gate line (not shown) according to a timing. The gate driver 40 may be an amorphous silicon gate (ASG) directly formed on a display panel (not shown), together with a gate line, a data line, a switching device and the like.

When the output image signal DAT transmitted to the data driver 20 has an abnormality such as when static electricity is generated in or flows into the driving device for the display device of FIG. 1, the output image signal DAT does not conform to the predetermined format. Thus, the data driver 20 that detected the non-conformity shifts the level of the lock signal LOCK transmitted to the signal controller 10 to the low level from the high level, thereby informing the signal controller 10 that an abnormal output image signal DAT has been received. The signal controller 10 having received the lock signal LOCK in the low state maintains the vertical synchronization start signal STV and the vertical clock signals CPV1 and CPV2 output to the level shifter 30 in an off level. Accordingly, all of the gate pulse start signal STVP and the pair of gate clock signals CKV and CKVB output to the gate driver 40 are maintained in the off level. Thus, a gate of voltage is continuously applied to all gate lines, so that an image, which was displayed on a screen just before the static electricity induced abnormality occurred, continues to be displayed on the screen. Thereafter, when the output image signal DAT returns to a normal state and thus conforms to the predetermined format, the data driver 20 shifts the level of the lock signal LOCK transmitted to the signal controller 10 to the high level from the low level, thereby informing the signal controller 10 that the output image signal DAT is in the normal state. Accordingly, the signal controller 10 normally transmits the vertical synchronization start signal STV and the vertical clock signals CPV1 and CPV2 to the level shifter 30. Then, a normal display is achieved at the start of a next frame in accordance with a timing of the vertical synchronization start signal STV.

As described above, when the soft fail is generated due to static electricity, an abnormal display is prevented by maintaining the vertical synchronization start signal STV and the vertical clock signals CPV1 and CPV2 in the off level and thus stopping an operation of the gate driver 40. However, in a driving device which is designed to perform a charge share in H-blank and V-blank sections to reduce power consumption, it may not be possible to prevent the abnormal image from being displayed only by maintaining the vertical synchronization start signal STV and the vertical clock signals CPV1 and CPV2 in the off level. This is because when a signal is not applied from the signal controller 10, a large amount of current leaks from a switching device connected to a pixel electrode since the pair of gate clock signals CKV and CKVB have a voltage level of about 5V corresponding to an intermediate level due to a charge share operation.

Hereinafter, a method of preventing the abnormal display caused by the soft fail in a driving device for a display device that performs the charge share will be described.

Figure 2:
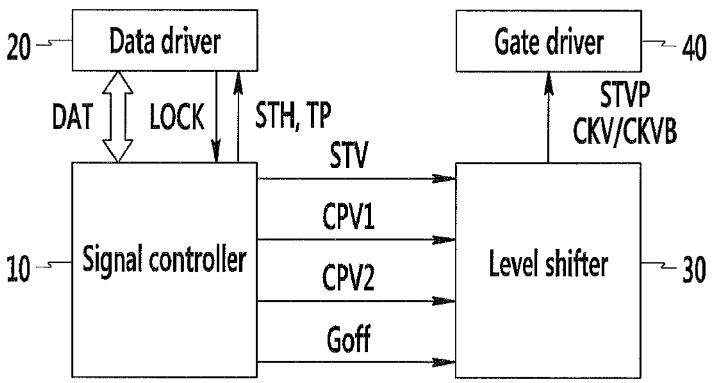
FIG. 2 is a block diagram of a driving device for a display device according to an exemplary embodiment of the present invention.
Figure 3:
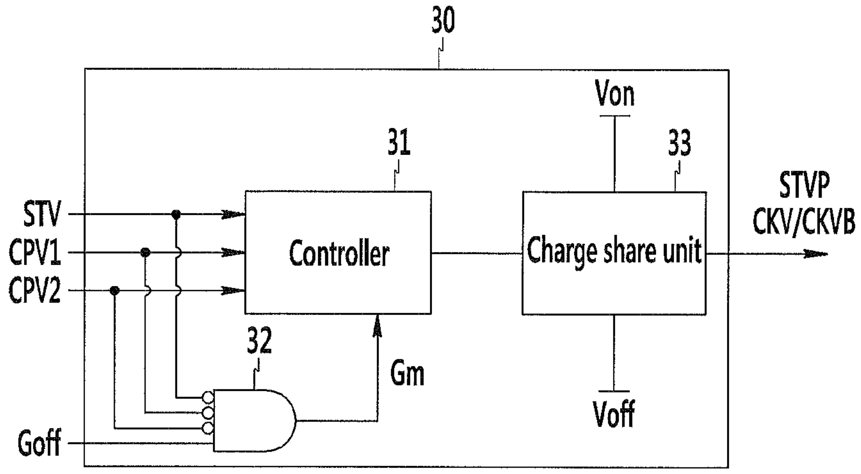
FIG. 3 is a block diagram illustrating a level shifter of the driving device in FIG. 2, according to an exemplary embodiment of the present invention.
Figure 4:
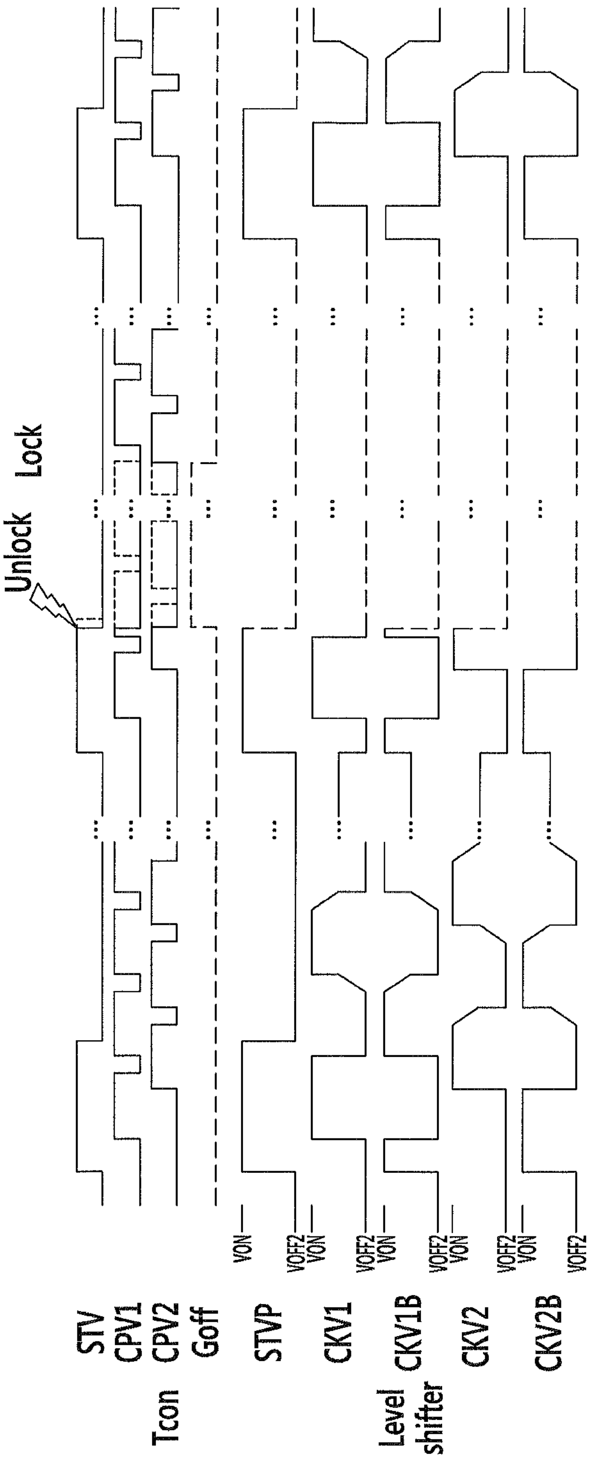
FIG. 4 is a signal waveform diagram of a signal controller of the driving device of FIG. 2 and the level shifter of FIG. 3, according to an exemplary embodiment of the present invention.

FIG. 2 is a block diagram of a driving device for a display device according to an exemplary embodiment of the present invention, FIG. 3 is a block diagram illustrating a level shifter of the driving device of FIG. 2, according to an exemplary embodiment of the present invention, and FIG. 4 is a signal waveform diagram of a signal controller of the driving device of FIG. 2 and the level shifter of FIG. 3, according to an exemplary embodiment of the present invention.

The present exemplary embodiment further includes a gate driver off signal Goff as a control signal applied to the level shifter 30 from the signal controller 10, and the level shifter 30 has a different configuration than that of FIG. 1. Hereinafter, the parts of the present exemplary embodiment which are different from the exemplary embodiment of FIG. 1 will be mainly described.

First, a configuration of the level shifter 30 will be described with reference to FIG. 3.

The level shifter 30 includes a controller 31, an AND gate 32 and a charge share unit 33.

The controller 31 receives the vertical synchronization start signal STY and the vertical clock signals CPV1 and CPV2 from the signal controller 10, receives a gate blocking signal Gm from the AND gate 32, controls the charge share unit 33 based on the received signals to generate the gate pulse start signal STVP and the pair of gate clock signals CKV and CKVB, and outputs the gate pulse start signal STVP and the pair of gate clock signals CKV and CKVB to the gate driver 40. Further, when the gate blocking signal Gm is in the high level, the controller 31 controls the charge share unit 33 to give the gate pulse start signal STVP and the gate clock signals CKV and CKVB an off voltage Voff, and output the gate pulse start signal STVP and the pair of gate clock signals CKV and CKVB to the gate driver 40.

The AND gate 32 receives the gate driver off signal Goff together with the vertical synchronization start signal STY and the vertical clock signals CPV1 and CM. The AND gate 32 puts the gate blocking signal Gm in the high level only when all of the vertical synchronization start signal STV and the vertical clock signals CPV1 and CPV2 are in the low level and the gate driver off signal Goff is in the high level. Otherwise, the AND gate 32 puts the gate blocking signal Gm in the low level. The AND gate 32 outputs the gate blocking signal Gm to the controller 31. By including the AND gate 32, the gate blocking signal Gin may be prevented from being in the high level when the gate driver off signal Goff is distorted due to static electricity and the like. In other words, only when the signal controller 10 outputs the vertical synchronization signal STY and the vertical clock signals CPV1 and CPV2 in the low level, and the gate driver off signal Goff in the high level to the level shifter 30, does the level shifter 30 give the gate pulse start signal STVP and the gate clock signals CKV and CKVB the off voltage Voff, and then output the gate pulse start signal STVP and the pair of gate clock signals CKV and CKVB in the off voltage Voff.

The charge share unit 33 amplifies voltages of the vertical synchronization start signal STV and the vertical clock signals CPV1 and CPV2 according to a control of the controller 31 to generate the gate pulse start signal STVP and the pair of gate clock signals CKV and CKVB, and outputs the gate pulse start signal STVP and the pair of gate clock signals CKV and CKVB to the gate driver 40, or makes the gate pulse start signal STVP and the gate clock signals CKV and CKVB have the off voltage Voff and outputs the gate pulse start signal STVP and the pair of gate clock signals CKV and CKVB to the gate driver 40.

As described above, only when all of the vertical synchronization start signal STV and the vertical clock signals CPV1 and CPV2 are in the low level and the gate driver off signal Goff is in the high level, does the level shifter 30 of FIG. 2 give the gate pulse start signal STVP and the gate clock signals CKV and CKVB the off voltage Voff, and output the gate pulse start signal STVP and the pair of gate clock signals CKV and CKVB to the gate driver 40, so that the gate off voltage is maintained in the gate line. Otherwise, a normal gate signal is applied to the gate line.

Referring to FIG. 4, when the soft fail is generated due to static electricity during normal driving, the data driver 20 shifts the level of the lock signal LOCK to the low level from the high level, and outputs the shifted signal to the signal controller 10 (unlock in FIG. 4). Accordingly, the signal controller 10 shifts levels of the vertical synchronization start signal STV and the vertical clock signals CPV1 and CPV2 to the low levels, shifts a level of the gate driver off signal Goff to the high level, and then outputs these signals to the level shifter 30. When the vertical synchronization start signal STV and the vertical clock signals CPV1 and CPV2 are in the low level and the gate driver off signal Goff is in the high level, the level shifter 30 makes all of the gate pulse start signal STVP and the gate clock signals CKV1, CKV1B, CKV2, and CKV2B have the off voltage Voff, and then outputs these signals. Here, the reason why there are four gate clock signals CKV1, CKV1B, CKV2, and CKV2B is that a case of using a pre-charging method in which gate on pulses applied to adjacent gate lines overlap each other is described as an example.

Thereafter, when the signal exchange between the signal controller 10 and the data driver 20 returns to the normal state, the data driver 20 shifts the level of the lock signal LOCK to the high level from the low level and then outputs the shifted signal to the signal controller 10 (lock in FIG. 4), and the signal controller 10 having received the shifted signal starts normally outputting the vertical synchronization start signal STV and the vertical clock signals CPV1 and CPV2. The level shifter 30 outputs the normal gate pulse start signal STVP and the gate clock signals CKV1, CKV1B, CKV2, and CKV2B according to an on pulse of the vertical synchronization start signal STV first appearing after the level of the lock signal LOCK is shifted to the high level from the low level.

As described above, by adding the gate driver off signal Goff to the control signal applied to the level shifter 30 from the signal controller 10, the abnormal display due to the soft fail may be prevented in the driving device for the display device that performs the charge share.

Figure 5:
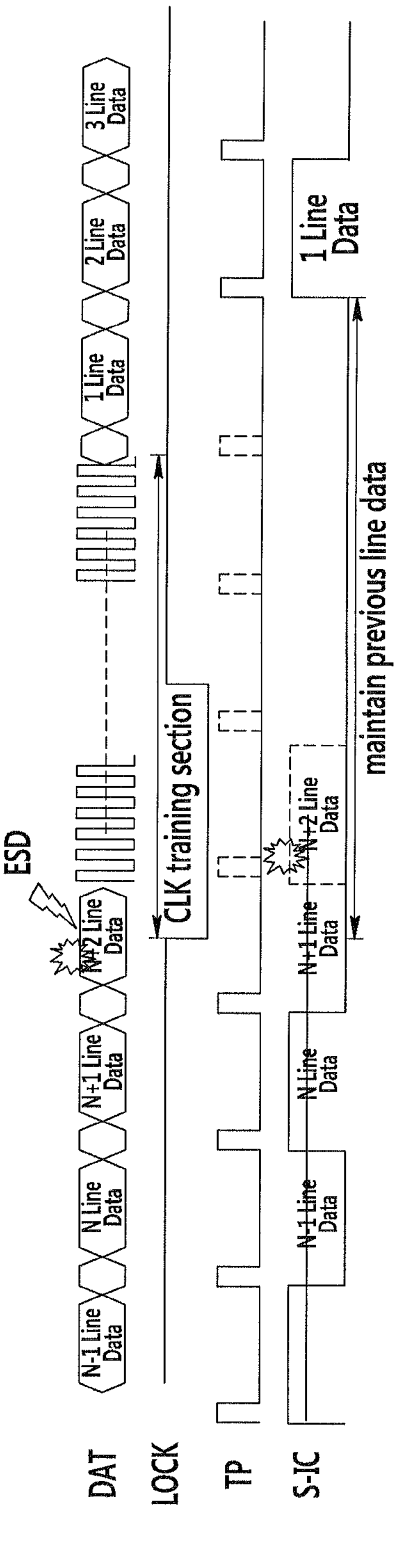
FIG. 5 is a signal waveform diagram of a data driver and a signal controller of a driving device for a display device according to an exemplary embodiment of the present invention.

FIG. 5 is a signal waveform diagram of a data driver and a signal controller of a driving device for a display device according to an exemplary embodiment of the present invention.

The driving device for the display device having the configuration of FIG. 1 or FIGS. 2 and 3 may be used in the exemplary embodiment of FIG. 5. In FIG. 5, DAT is the output image signal output to the data driver 20 from the signal controller 10, LOCK is the lock signal transmitted to the signal controller 10 by the data driver 20, and TP is the load signal. S-IC is a graph showing an operation state of the data driver 20.

When a soft fail due to static electricity is generated, an operation of the data driver 20 is stopped in the present exemplary embodiment. Specifically, when the soft fail due to the static electricity is generated during normal driving, the data driver 20 shifts the level of the lock signal LOCK to the low level from the high level, and outputs the shifted signal to the signal controller 10. Accordingly, the signal controller 10 maintains the load signal IF in the low state, and thus stops a data voltage applying operation of the data driver 20. Therefore, a data voltage does not flow in the data line.

Further, as described in the above exemplary embodiments, since the gate off voltage is continuously applied to the gate line, the image displayed just before the static electricity induced abnormality occurs is continuously displayed. Thereafter, when the output image signal DAT returns to the normal state and thus conforms to the predetermined format, the data driver 20 shifts the level of the lock signal LOCK transmitted to the signal controller 10 to the high level from the low level, thereby informing the signal controller 10 that the output image signal DAT has returned to the normal state. Accordingly, the signal controller 10 normally transmits the load signal TP to the data driver 20. Then, the data driver 20 stores an analog data voltage corresponding to a next frame in a buffer according to the load signal TP, and then applies the stored analog data voltage to the data line.

According to an exemplary embodiment of the present invention, the level shifter 30 maintains the vertical synchronization start signal STV and the vertical clock signals CPV1 and CPV2 to have an off voltage Voff when a soft fail is generated, so that an image just before the soft fail is generated is maintained, thereby preventing an abnormal image from being displayed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A display device, comprising:

a data driver for applying a data signal to a data line;

a gate driver for applying a gate signal to a gate line;

a level shifter for shifting a voltage level of a signal applied to the gate driver; and a signal controller, for controlling the data driver, the level shifter, and the gate driver, wherein when a signal exchange between the data driver and the signal controller has an abnormality, the signal controller maintains a control signal applied to the level shifter in an off level, wherein the control signal includes a vertical synchronization start signal and vertical clock signals, wherein the signal controller outputs a gate driver off signal to the level shifter, and the signal controller puts the gate driver off signal in a high level and transmits the gate driver off signal to the level shifter when the signal exchange between the data driver and the signal controller has the abnormality, wherein the level shifter comprises:

a logic gate for receiving the gate driver off signal, the vertical synchronization start signal and the vertical clock signals, putting a gate blocking signal in the high level and outputting the gate blocking signal to a controller of the level shifter when the vertical synchronization start signal and the vertical clock signals are in a low level and the gate driver off signal is in the high level;

the controller of the level shifter for receiving the vertical synchronization start signal, the vertical clock signals and the gate blocking signal; and a charge share unit for amplifying voltages of the vertical synchronization start signal and the vertical clock signals to generate a gate pulse start signal and a pair of gate clock signals and outputting the gate pulse start signal and the pair of gate clock signals to the gate driver when the gate blocking signal is in the low level, or giving the gate pulse start signal and the pair of gate clock signals an off voltage and outputting the gate pulse start signal and the pair of gate clock signals to the gate driver when the gate blocking signal is in the high level.

2. The display device of claim 1, wherein the abnormality is due to static electricity.

3. The display device of claim 1, wherein:

the data driver checks whether an output image signal received from the signal controller conforms to a preset format, puts a lock signal in a high state and outputs the lock signal to the signal controller when the output image signal conforms to the preset format, and puts the lock signal in a low state and outputs the lock signal to the signal controller when the output image signal does not conform to the preset format.

4. The display device of claim 3, wherein:

when the lock signal is in the low state, the signal controller maintains a load signal output to the data driver in the low state.

5. The display device of claim 1, wherein:

the data driver checks whether an output image signal received from the signal controller conforms to a preset format, puts a lock signal in a high state and outputs the lock signal to the signal controller when the output image signal conforms to the preset format, and puts the lock signal in a low state and outputs the lock signal to the signal controller when the output image signal does not conform to the preset format.

6. The display device of claim 5, wherein:

when the lock signal is in the low state, the signal controller maintains a load signal output to the data driver in the low state.

7. The display device of claim 5, wherein the lock signal in the low state indicates the signal exchange between the data driver and the signal controller has the abnormality.

8. A method of driving a display device, comprising:

checking, by using a data driver, whether an output image signal received from a signal controller conforms to a preset format, and putting a lock signal in a low state and outputting the lock signal to the signal controller when the output image signal does not conform to the preset format, and maintaining, by using the signal controller, a control signal applied to a level shifter in an off level when the lock signal is in the low state, wherein the control signal includes vertical synchronization start signal and vertical clock signals, wherein the signal controller outputs a gate driver off signal to the level shifter, and the signal controller puts the gate driver off signal in a high level and outputs the gate driver off signal to the level shifter when the lock signal is in the low state, wherein the method further comprises:

receiving, at a logic gate of the level shifter, the gate driver off signal, the vertical synchronization start signal and the vertical clock signals, putting a gate blocking signal in the high level and outputting the gate blocking signal to a controller of the level shifter when the vertical synchronization start Signal and the vertical clock signals are in a low level and the gate driver off signal is in the high level;

receiving, at the controller of the level shifter, the vertical synchronization start signal, the vertical clock signals and the gate blocking signal; and amplifying, at a charge share unit of the level shifter, voltages of the vertical synchronization start signal and the vertical clock signals to generate a gate pulse start signal and a pair of gate clock signals and outputting the gate pulse start signal and the pair of gate clock signals to a gate driver when the gate blocking signal is in the low level, or giving the gate pulse start signal and the pair of gate clock signals an off voltage and outputting the gate pulse start signal and the pair of gate clock signals to the gate driver when the gate blocking signal is in the high level.

9. The method of driving a display device of claim 8, wherein the gate pulse start signal and the pair of gate clock signals having the off voltage are output to the gate driver when the vertical synchronization start signal and the vertical clock signals are in the low level and the gate driver off signal is in the high level.

10. The method of driving a display device of claim 8, further comprising:

maintaining, by using the signal controller, a load signal output to the data driver in the low state when the lock signal is in the low state.

11. A display device, comprising:

a data driver, a gate driver, a signal controller and a level shifter, the data driver configured to identify an abnormality in a signal exchange between the signal controller and the data driver and generate a lock signal, the signal controller configured to maintain a level of a first control signal applied to the level shifter in response to the lock signal, the level shifter configured to maintain a level of a second control signal applied to the gate driver in response to the first control signal, and the gate driver configured to continuously apply a gate off voltage to all gate lines in response to the second control signal, wherein the first control signal includes a vertical synchronization start signal and vertical clock signals, wherein the signal controller outputs a gate driver off signal to the level shifter, and the signal controller puts the gate driver off signal in a high level and transmits the gate driver off signal to the level shifter when the signal exchange between the data driver and the signal controller has the abnormality, wherein the level shifter comprises:

a logic gate for receiving the gate driver off signal, the vertical synchronization start signal and the vertical clock signals, putting a gate blocking signal in the high level and outputting the gate blocking signal to a controller of the level shifter when the vertical synchronization start signal and the vertical clock signals are in a low level and the gate driver off signal is in the high level;

the controller of the level shifter for receiving the vertical synchronization start signal, the vertical clock signals and the gate blocking signal; and a charge share unit for amplifying voltages of the vertical synchronization start signal and the vertical clock signals to generate a gate pulse start signal and a pair of gate clock signals and outputting the gate pulse start signal and the pair of gate clock signals to the gate driver when the gate blocking signal is in the low level, or giving the gate pulse start signal and the pair of gate clock signals an off voltage and outputting the gate pulse start signal and the pair of gate clock signals to the gate driver when the gate blocking signal is in the high level.

12. The display device of claim 11, wherein the continuous application of the gate of voltage causes an image previously displayed on a screen of the display device to continue to be displayed on the screen.

13. The display device of claim 11, wherein when the signal exchange between the signal controller and the data driver becomes normal, a gate on voltage is applied to the gate lines.

* * * * *